United States Patent [19]

Taga et al.

[11] Patent Number: 4,488,456
[45] Date of Patent: Dec. 18, 1984

[54] ELECTRICAL/HYDRAULIC TRANSMISSION CONTROL SYSTEM VARYING LINE PRESSURE ACCORDING TO ENGINE LOAD

[75] Inventors: Yutaka Taga; Shinya Nakamura, both of Toyota, Japan

[73] Assignee: Toyota Jidosha Kabushiki Kaisha, Toyota, Japan

[21] Appl. No.: 401,605

[22] Filed: Jul. 26, 1982

[30] Foreign Application Priority Data

Aug. 19, 1981 [JP] Japan .................... 56-130474

[51] Int. Cl.$^3$ .................... B60K 41/08; F16H 3/74
[52] U.S. Cl. .................... 74/866; 74/752 A; 74/867
[58] Field of Search .................... 74/866, 752 A, 865, 74/864, 863, 862, 861, 752 D, 867, 752 C

[56] References Cited

U.S. PATENT DOCUMENTS

| 3,710,647 | 1/1973 | Dach et al. | 74/866 X |
| 3,752,011 | 8/1973 | Casey et al. | 74/866 X |
| 3,942,393 | 3/1976 | Förster et al. | 74/752 A X |
| 4,102,222 | 7/1978 | Miller et al. | 74/866 |
| 4,267,750 | 5/1981 | Espenschied et al. | 74/752 A X |
| 4,283,970 | 8/1981 | Vukovich | 74/866 |
| 4,331,045 | 5/1982 | Piech et al. | 74/867 |
| 4,365,526 | 12/1982 | Suga et al. | 74/866 |
| 4,388,844 | 6/1983 | Arai et al. | 74/752 A X |
| 4,388,845 | 6/1983 | Kishi et al. | 74/866 X |
| 4,394,827 | 7/1983 | Kubo et al. | 74/868 |

Primary Examiner—Allan D. Herrmann
Assistant Examiner—Stephen B. Andrews
Attorney, Agent, or Firm—Oblon, Fisher, Spivak, McClelland & Maier

[57] ABSTRACT

A control system for an automatic transmission which includes one or more hydraulically actuated friction engaging mechanisms. An electrical control device receives electrical signals representing engine load and vehicle speed from sensors for these quantities, decides which speed stage of the transmission should currently be engaged, and selectively supplies actuating electrical energy to one or more hydraulic fluid pressure switching valves. These valves selectively provide supply of line pressure from a line pressure generator to the hydraulically actuated friction engaging mechanisms so as selectively to engage the desired speed stage of the transmission. This line pressure generator which produces the line pressure is controlled according to the current value of a certain parameter representative of engine load. The value of the line pressure generated by this line pressure generator varies in response to the current value of this parameter representative of engine load. Accordingly the value of line pressure can be adjusted according to engine load so as to be most appropriate for engaging each one of the friction engaging mechanisms from its disengaged condition when so required, the line pressure being thus varied in response to engine load which determines the torque which the friction engaging mechanisms will each be required to transmit when engaged. Thus both jerky engagement and also slippage during the process of engagement of the friction engaging mechanisms can be prevented, and such smooth engagement of the friction engaging mechanisms ensures long life for the transmission.

7 Claims, 2 Drawing Figures

ELECTRICAL/HYDRAULIC TRANSMISSION CONTROL SYSTEM VARYING LINE PRESSURE ACCORDING TO ENGINE LOAD

BACKGROUND OF THE INVENTION

The present invention relates to a transmission control system for an automatic transmission for an automotive vehicle such as a passenger car, and more particularly relates to a transmission control system for an automatic transmission for an automotive vehicle such as a passenger car or the like, in which the actual decision as to what speed stage of the transmission should be chosen to be engaged at each particular time is performed electrically by an electrical transmission control device in response to electrical signals indicative of the current operational conditions of the vehicle (such as engine load and vehicle road speed), and in which the selective supplying of hydraulic fluid pressure to at least one hydraulic fluid pressure actuated friction engaging mechanism of the transmission, in order to engage said chosen transmission speed stage, is performed by an electrically actuated hydraulic fluid pressure switching valve.

Generally, an automatic transmission for an automotive vehicle comprises a gear transmission mechanism and a transmission control system. The gear transmission mechanism is constructed so as to be able to provide a plurality of different rotational speed ratios between its power input shaft and its power output shaft, according to the pattern of selective supply of actuating hydraulic fluid pressure to one or more hydraulic fluid pressure actuated friction engaging mechanisms comprised within said gear transmission mechanism such as hydraulically actuated clutches and hydraulically actuated brakes; and the transmission control system is constructed so as to decide, based upon the current operational parameters of the vehicle, conventionally including the current values of a parameter representative of engine load and of a parameter representative of vehicle road speed, what speed stage is the proper speed stage for said gear transmission mechanism to be currently providing, i.e. what speed stage is the most appropriate for the vehicle incorporating this automatic transmission to be operated in at the current time. Further, said transmission control system is constructed so as to implement this speed stage decision which it makes by providing appropriate patterns of hydraulic fluid pressure supply and non supply to the aforesaid hydraulic fluid pressure actuated friction engaging mechanisms of the gear transmission mechanism such as the hydraulic clutches and hydraulic brakes.

Thus, when it is decided by the transmission control system that it is an appropriate time for a change of the selected speed stage of the gear transmission mechanism from the currently selected speed stage to a new speed stage which is now newly desired, then said transmission control system alters the pattern of selective supply and non supply of hydraulic fluid pressure to the hydraulic fluid pressure actuated friction engaging mechanisms of the gear transmission mechanism, thus altering the pattern of engagement and non engagement of said hydraulic fluid pressure actuated friction engaging mechanisms, and thereby the gear transmission mechanism is shifted from its earlier selected speed stage to its currently and newly desired speed stage.

Conventionally in the prior art transmission control systems have been hydraulic ones. In such a hydraulic transmission control system, a throttle hydraulic fluid pressure control valve is provided, which senses the amount of opening of a throttle valve of the internal combustion engine of the vehicle (this throttle opening amount being taken as a parameter indicative of vehicle engine load) and which modulates a source of hydraulic fluid pressure, so as to output said modulated hydraulic fluid pressure as a hydraulic fluid pressure signal (hereinafter to be called the throttle hydraulic fluid pressure signal), substantially proportional to said throttle opening, i.e. substantially proportional to vehicle engine load; and also a governor hydraulic fluid pressure control valve is provided, which senses the revolution speed of the power output shaft of the gear transmission mechanism or of some other member thereof (this revolution speed being taken as a parameter indicative of vehicle road speed) and which modulates a source of hydraulic fluid pressure, so as to output said modulated hydraulic fluid pressure as a hydraulic fluid pressure signal (hereinafter to be called the governor hydraulic fluid pressure signal), substantially proportional to the revolution speed of said power output shaft or other member, i.e. substantially proportional to vehicle road speed.

In such a prior art type of hydraulic transmission control system, these two hydraulic fluid pressure signals, i.e. the throttle hydraulic fluid pressure signal and the governor hydraulic fluid pressure signal, are supplied to a hydraulic speed stage decision making system, which includes one or a plurality of hydraulic speed shifting valves. In each of these one or more hydraulic speed shifting valves, a spool element or valve element is provided; and the throttle hydraulic fluid pressure and the governor hydraulic fluid pressure act in opposition on each of these valve elements of each of these hydraulic speed shifting valves, each of these valve elements being driven by the throttle hydraulic fluid pressure and the governor hydraulic fluid pressure in opposite directions. Further, typically other biasing forces such as spring forces and other hydraulic forces also act on each of these valve elements; and thus in each of these hydraulic speed shifting valves the spool or valve element thereof moves to and fro according to a predetermined balance relationship between the throttle hydraulic fluid pressure and the governor hydraulic fluid pressure, being moved in a one direction when the throttle hydraulic fluid pressure overcomes the governor hydraulic fluid pressure in its biasing action on the valve element of said hydraulic speed shifting valve, and being moved in the direction opposite to said one direction when the governor hydraulic fluid pressure overcomes the throttle hydraulic fluid pressure in its biasing action on said valve element of said hydraulic speed shifting valve.

Each of these hydraulic speed shifting valves controls, according to the position to which its valve element is moved, selective supply of actuating hydraulic fluid pressure from a source of hydraulic fluid pressure to one or more of the aforesaid hydraulic fluid pressure actuated friction engaging mechanisms such as hydraulic clutches and/or hydraulic brakes; and thus the different combinations of engagement and non engagement of said hydraulic fluid pressure actuated friction engaging mechanisms required for providing each of the speed stages of the gear transmission mechanism are provided by the transmission control system, according to the current operational state of the vehicle as indicated by said throttle hydraulic fluid pressure, by said governor hydraulic fluid pressure, and possibly by other operational parameters of the vehicle, which may be similarly converted into hydraulic fluid pressures for biasing the aforesaid valve elements of the hydraulic speed shifting valves.

On the other hand, it has been recently widely developed to operate the speed shifting valves by electromagnetic actuators operated by an electronic computer control means which determines the speed shifting points by electronic computation based upon input data with regard to the throttle opening, the vehicle road speed, etc. In these electronic transmission control systems, the amount of throttle opening is given as the throttle hydraulic fluid pressure and the amount of vehicle road speed is given as the governor hydraulic fluid pressure.

Typically in such prior art transmission control systems the supply of hydraulic fluid pressure for being switched as explained above by the speed shifting valves and for thus being selectively supplied to the hydraulic fluid pressure actuated friction engaging mechanisms of the gear transmission mechanism has been a line hydraulic fluid pressure, which has also been used as a source of pressure for being modulated by the aforesaid throttle hydraulic fluid pressure control valve and the aforesaid governor hydraulic fluid pressure control valve, so as to produce respectively said throttle hydraulic fluid pressure and said governor hydraulic fluid pressure. This has given rise to some imperfections in the such a prior art hydraulic system of transmission control, which will now be explained.

When a hydraulic fluid pressure actuated friction engaging mechanism such as a hydraulic clutch or a hydraulic brake is engaged from the disengaged condition by being supplied with actuating hydraulic fluid pressure from the state of not being supplied with actuating hydraulic fluid pressure, then it rotationally couples together two elements (which in future in this specification will be referred to as the coupled elements) which formerly were rotating with respect to one another. For example, these coupled elements may typically, in the case of a hydraulic fluid pressure actuated clutch, be two sets of clutch plate elements which are squeezed together by an element such as a piston element which is driven by said actuating hydraulic fluid pressure, or may be, in the case of a hydraulic fluid pressure actuated brake, two sets of brake plate elements which are again squeezed together by an element such as a piston element which is driven by said actuating hydraulic fluid pressure. When the element such as a piston element which is driven by said actuating hydraulic fluid pressure first presses together said coupled elements, which are rotating with respect to one another, then when these coupled elements first meet one another naturally they slide against one another, but since they are being pressed together by the biasing force of the actuating hydraulic fluid pressure which is acting via said element such as a piston element, soon these coupled elements grip against one another and cease to rotate with respect to one another. Thus the hydraulic fluid pressure actuated clutch or the hydraulic fluid pressure actuated brake engages, i.e. performes the action of so called "biting".

For the shifting of the gear transmission mechanism which includes this hydraulic fluid pressure actuated friction engaging mechanism to be performed in the most desirable manner, i.e. in the smoothest manner without too much slipping, it is desirable that this biting of the friction engaging mechanism should not occur either too quickly or too slowly. In more detail, if the coupled elements of the hydraulic fluid pressure actuated friction engaging mechanism reach rotational rest with respect to one another too quickly, i.e. if the hydraulic fluid pressure actuated friction engaging mechanism bites too quickly, which will occur in the event that the actuating hydraulic fluid pressure therefor is too high, then the shifting of the gear transmission mechanism will be rather jerky and substantial shift shock will occur during such a change of transmission speed stage, which can seriously deteriorate the service life of the automatic transmission as a whole, as well as possibly damaging other components of the vehicle drive train. On the other hand, if the coupled elements of the hydraulic fluid pressure actuated friction engaging mechanism reach rotational rest with respect to one another too slowly, i.e. if the hydraulic fluid pressure actuated friction engaging mechanism bites too slowly, which will occur in the event that the actuating hydraulic fluid pressure therefor is too low, then the shifting of the gear transmission mechanism will be too slow, and serious slippage during said shifting of the gear transmission mechanism may occur. In this case, over revving of the internal combustion engine of the vehicle incorporating the automatic transmission may well occur, which will aggravate the effect of said slippage. This slippage effect can seriously deteriorate the service life of the automatic transmission as a whole, possibly even causing sudden failure thereof, due to burning out of the coupled members of the hydraulic fluid pressure actuated friction engaging mechanism or the like by the generation of a large amount of heat due to friction.

In order to keep the speed of engagement of the hydraulic fluid pressure actuated friction engaging mechanisms neither too fast nor too slow, therefore, the actuating hydraulic fluid pressure for these hydraulic fluid pressure actuated friction engaging mechanisms should be regulated to an appropriate level, neither too high nor too low. This appropriate hydraulic fluid pressure level should be varied according to the amount of torque that the hydraulic fluid pressure actuated friction engaging mechanism is going to transmit, with further consideration of the condition that the hydraulic fluid pressure actuated friction engaging mechanism has been finally engaged at a certain speed stage to transmit a required torque, and it is known that the appropriate hydraulic fluid pressure level should actually be varied approximately proportionally to the amount of torque to be transmitted in the low to medium engine load range and should be kept substantially constant or should increase by a small amount as the torque to be transmitted increases in the middle to high engine load range. Such a variation in the actuating hydraulic fluid pressure for the hydraulic fluid pressure actuated friction engaging mechanisms of an automatic transmission system for a vehicle, by keeping the pressure required for the supply of said actuating hydraulic fluid pressure as low as possible, further has the desirable effect of minimizing the amount of energy produced by the internal combustion engine of the vehicle which is required for pumping hydraulic fluid in the transmission and in the transmission control system.

Conventionally, this desirable regulation according to the engine load of the line hydraulic fluid pressure which is used as a source for the actuating hydraulic fluid pressure which is selectively supplied to the hydraulic fluid pressure actuated friction engaging mechanisms of the gear transmission mechanism of the automatic transmission, has been done according to the throttle hydraulic fluid pressure. When the line hydraulic fluid pressure is thus modified in accordance with the throttle hydraulic fluid pressure, it becomes sometimes difficult to design the behavior of the throttle hydraulic fluid pressure to be optimum for the design of the speed shift points of the gear transmission mechanism and also to design the behavior of the line hydraulic fluid pressure to be optimum for obtaining the above-mentioned appropriate hydraulic fluid pressure level characteristics for the engagement and disengagement of the hydraulic fluid pressure actuated friction engaging mechanisms.

Accordingly, therefore, since the preservation of the correct speed stage shift points for the gear transmission mechanism of the automatic transmission is of paramount importance, in view of the necessity to provide proper transmission operation, the optimization from the point of view of good engagement of the hydraulic fluid pressure actuated friction engaging mechanisms of the behavior of variation of the line hydraulic fluid pressure in relation to variation of the load on the internal combustion engine of the vehicle has been required to be sacrificed, in the design of prior art automatic gear transmission mechanism control systems.

SUMMARY OF THE INVENTION

Accordingly, it is the primary object of the present invention to provide a transmission control system, in which the decisions as to which speed stage the transmission should be set are performed based upon engine parameters including a first engine load signal as the engine load signal, while the line hydraulic fluid pressure is tailored based upon engine parameters including a second engine load signal as the engine load signal which is independent of said first engine load signal.

It is a further object of the present invention to provide a transmission control system, in which the decisions as to which speed stage the transmission should be set are performed electrically, and in which said first engine load signal is an electric signal generated by an electric throttle sensor.

It is a further object of the present invention to provide such a transmission control system, in which said second engine load signal which modulates said line hydraulic fluid pressure is the throttle hydraulic fluid pressure generated by a throttle hydraulic fluid pressure generator.

It is a further object of the present invention to provide such a transmission control system, in which the actuating hydraulic fluid pressure for a hydraulic fluid pressure actuated friction engaging mechanism is properly and appropriately modulated according to variation in the engine load.

It is a further object of the present invention to provide such a transmission control system, in which the coupled elements of a hydraulic fluid pressure actuated friction engaging mechanism are pressed together, when the hydraulic fluid pressure actuated friction engaging mechanism is to be engaged, with the most appropriate pressing force, taking into account the current value of engine load.

It is a further object of the present invention to provide such a transmission control system, in which the coupled elements of a hydraulic fluid pressure actuated friction engaging mechanism, when the hydraulic fluid pressure actuated friction engaging mechanism is to be engaged, are not pressed together too hard, taking into account the current value of engine load.

It is a further object of the present invention to provide such a transmission control system, in which the coupled elements of a hydraulic fluid pressure actuated friction engaging mechanism, when the hydraulic fluid pressure actuated friction engaging mechanism is to be engaged, are not pressed together too softly, taking into account the current value of engine load.

It is a further object of the present invention to provide such a transmission control system, in which the coupled elements of a hydraulic fluid pressure actuated friction engaging mechanism, when pressed together when the hydraulic fluid pressure actuated friction engaging mechanism is to be engaged, reach a state of rotational rest with respect to one another in approximately an appropriate time period, taking into consideration the current value of engine load.

It is a further object of the present invention to provide such a transmission control system, in which the coupled elements of a hydraulic fluid pressure actuated friction engaging mechanism, when pressed together when the hydraulic fluid pressure actuated friction engaging mechanism is to be engaged, do not reach a state of rotational rest with respect to one another too quickly, taking into consideration the current value of engine load.

It is a further object of the present invention to provide such a transmission control system, in which the coupled elements of a hydraulic fluid pressure actuated friction engaging mechanism, when pressed together when the hydraulic fluid pressure actuated friction engaging mechanism is to be engaged, do not reach a state of rotational rest with respect to one another too slowly, taking into consideration the current value of engine load.

It is a further object of the present invention to provide such a transmission control system, in which the coupled elements of a hydraulic fluid pressure actuated friction engaging mechanism, when pressed together when the hydraulic fluid pressure actuated friction engaging mechanism is to be engaged, bite together well at an appropriate timing, taking into consideration the current value of engine load.

It is a further object of the present invention to provide such a transmission control system, in which the risk of burning out of the coupled elements of a hydraulic fluid pressure actuated friction engaging mechanism when said coupled elements are pressed together when said hydraulic fluid pressure actuated friction engaging mechanism is to be engaged, is minimized.

It is a further object of the present invention to provide such a transmission control system, in which the risk of slippage of the hydraulic fluid pressure actuated friction engaging mechanisms of said automatic transmission during changing of the speed stage thereof is minimized.

It is a yet further object of the present invention to provide such a transmission control system, in the operation of which the risk of breakdown of said automatic transmission is minimized.

It is a yet further object of the present invention to provide such a transmission control system, by the operation of which the service life of the transmission as a whole is maximized.

It is a yet further object of the present invention to provide such a transmission control system, by the operation of which the service life of the power train of the vehicle as a whole is maximized.

It is a yet further object of the present invention to provide such a transmission control system, by the operation of which jerking of the transmission during changing of speed stage of said transmission is minimized.

It is a yet further object of the present invention to provide such a transmission control system, by the operation of which transmission shift shock during changing of speed stage of said transmission is minimized.

It is a yet further object of the present invention to provide such a transmission control system, by the operation of which smooth changing of speed stage of said transmission is available.

It is a yet further object of the present invention to provide such a transmission control system, by the operation of which the amount of energy produced by the internal combustion engine of the vehicle to which the transmission is fitted which is used for pumping hydraulic fluid in the transmission is minimized.

It is a yet further object of the present invention to provide such a transmission control system, by the operation of which the fuel economy of the vehicle incorporating the transmission is good.

According to the present invention, these and other objects are accomplished by, for an automatic transmission, for a vehicle comprising an engine, comprising a gear transmission mechanism which comprises a power input shaft powered by said engine, a power output shaft which powers said vehicle so as to drive said vehicle along the road, and at least one hydraulic fluid pressure actuated friction engaging mechanism; and which according to selective supply of hydraulic fluid pressure to said hydraulic fluid pressure actuated friction engaging mechanism provides particular ones of a plurality of speed stages between said power input shaft and said power output shaft: a transmission control system, comprising: (a) first and second engine load sensors which sense the current values of parameters representative of the load on said internal combustion engine of said vehicle and which output first and second engine load signals representative of said current values of said parameters representing engine load respectively; (b) a vehicle road speed sensor which senses the current value of a parameter representative of the current road speed of said vehicle and which outputs a vehicle road speed signal representative of said current value of said parameter representing vehicle road speed; (c) a line hydraulic fluid pressure generator which receives the current value of said first engine load signal from said first engine load sensor, and which generates a line hydraulic fluid pressure varying in response to the current value of said first engine load signal; (d) an electrically actuated hydraulic fluid pressure switching valve, which according to selective supply of actuating electrical energy thereto selectively supplies said line hydraulic fluid pressure to said hydraulic fluid pressure actuated friction engaging mechanism as an actuating hydraulic fluid presure; and (e) an electrical control device, which receives the current value of said second engine load signal from said second engine load sensor and the current value of said vehicle road speed signal from said vehicle road speed sensor, and which according to the current values of said engine load electrical signal and said vehicle road speed signal selectively supplies actuating energy to said electrically actuated hydraulic fluid pressure switching valve.

According to such a structure, since the line hydraulic fluid pressure is varied by the line hydraulic fluid pressure generator according to the value of said first engine load signal, it is possible to tailor the behavior of variation of said line hydraulic fluid pressure with regard to variation of engine load to be most suitable for serving for actuating said hydraulic fluid pressure actuated friction engaging mechanism, in various conditions of engine load. Further, because the information regarding the current values of engine load and vehicle road speed which is received by said electrical control device is transmitted to said electrical control device from said second engine load sensor separate from said first engine load sensor and from said vehicle road speed sensor, the speed shifting characteristics of said electric control device will not be affected in any way by the tailoring of the behavior of said line hydraulic fluid pressure with respect to variation of engine load.

Further, according to a particular aspect of the present invention, these and other objects are more particularly and concretely accomplished by such a transmission control system as described above, wherein said line hydraulic fluid pressure generator increases the line hydraulic fluid pressure which it generates approximately proportionally to engine load with a certain first proportionality ratio as engine load increases from the low engine load region to the medium engine load region, and wherein said line hydraulic fluid pressure generator increases the line hydraulic fluid pressure which it generates approximately proportionately to engine load with a certain second proportionality ratio as engine load increases from the medium engine load region to the high engine load region, said second proportionality constant being substantially less than said first proportionality constant.

According to such a structure, this behavior of variation of the line hydraulic fluid pressure with respect to variation in the engine load, first as engine load increases from the low engine load region up to the medium engine load region increasing proportionally with said first relatively large proportionality ratio, and then with further increase in engine load up to the high engine load region increasing proportionally with said second relatively small proportionality ratio, is well adjusted to the variation with respect to engine load of the torque required to be transitted by said hydraulic fluid pressure actuated friction engaging mechanism independently from the speed shifting characteristics of the electric control device, though said speed shifting characteristics are also determined by engine load as one of the parameters concerned.

Further, according to an alternative particular aspect of the present invention, these and other objects are more particularly and concretely accomplished by such transmission control system as first detailed above, wherein said line hydraulic fluid pressure generator increases the line hydraulic fluid pressure which it generates approximately proportionately to engine load with a certain proportionality ratio as engine load increases from the low engine load region to the medium engine load region, and wherein said line hydraulic fluid pressure generator keeps the line hydraulic fluid pressure which it generates approximately constant as engine load increases from the medium engine load region to the high engine load region.

According to such a structure, this behavior of variation of the line hydraulic fluid pressure with respect to variation in the engine load, first as engine load increases from the low engine load region up to the medium engine load region increasing proportionally with said proportionality ratio, and then remaining substantially constant with further increase in engine load up to the high engine load region, is well adjusted to the variation with respect to engine load of the torque required to be transmitted by said hydraulic fluid pressure actuated friction engaging mechanism independently from the speed shifting characteristics of the electric control device, though said speed shifting characteristics are also determined by engine load as one of the parameters concerned.

Further, according to another particular aspect of the present invention, these and other objects are more particularly and concretely accomplished by such a transmission control system of any of the sorts detailed above, wherein said line hydraulic fluid pressure generator generates a line hydraulic fluid pressure which is approximately proportional to the torque required to be transmitted by said hydraulic fluid pressure actuated friction engaging mechanism when said hydraulic fluid pressure actuated friction engaging mechanism is engaged by being supplied with actuating hydraulic fluid pressure, over substantially the entire engine load range.

According to such a structure, because the line hydraulic fluid pressure is substantially always kept substantially proportional to the torque which said hydraulic fluid pressure actuated friction engaging mechanism is required to transmit when engaged, thus, when said line hydraulic fluid pressure is used as a source of actuating hydraulic fluid pressure for engaging said hydraulic fluid pressure actuated friction engaging mechanism from the disengaged condition, this engagement of said hydraulic fluid pressure actuated friction engaging mechanism will occur smoothly, without either too quick and jerky engagement or too slow and slipping engagement, over substantially the entire region of engine load, while the predetermined schedule of speed shifting of the gear transmission mechanism is exactly performed. Thus good shifting of said gear transmission mechanism between its various speed stages is promoted.

Further, according to a particular constructional aspect of the present invention, these and other objects are more particularly and concretely accomplished by a transmission control system of any of the first three sorts detailed above, wherein said line hydraulic fluid pressure generator comprises a primary line hydraulic fluid pressure regulation valve which generates a substantially constant hydraulic fluid pressure and a secondary line hydraulic fluid pressure regulation valve which modulates said substantially constant hydraulic fluid pressure to produce said line hydraulic fluid pressure.

According to such a structure, said primary line hydraulic fluid pressure regulation valve can provide said substantially constant hydraulic fluid pressure as a source of hydraulic fluid pressure to be further modified by said secondary line hydraulic fluid pressure regulation valve, which then further adjusts the pressure value thereof according to the value of said first engine load signal. This division of functions makes for better operability of the line hydraulic fluid pressure generator.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
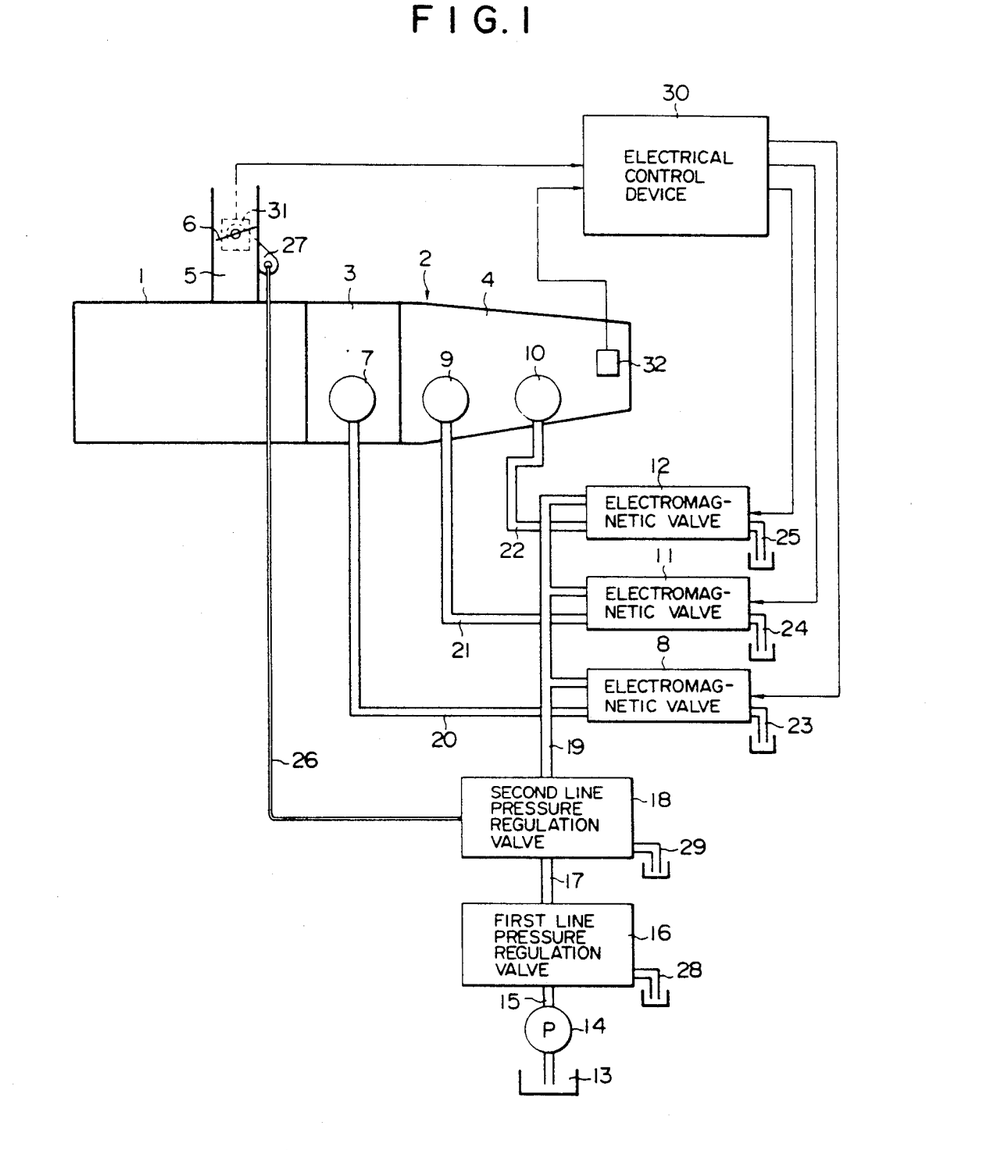
FIG. 1 is a schematic illustration of an internal combustion engine and of an automatic transmission incorporating a gear transmission mechanism which is controlled by a transmission control system according to said preferred embodiment of the present invention.

The present invention will now be described with reference to a preferred embodiment thereof, and with reference to the appended drawings. FIG. 1 shows the overall construction of an automatic transmission incorporating a transmission control system according to the present invention, in partly schematic form. In this figure, the reference numeral 1 designates an internal combustion engine of a vehicle (not shown in the figures), and the reference numeral 2 generally designates an automatic transmission, which is coupled to said internal combustion engine 1, and which receives rotational power therefrom. The automatic transmission 2 comprises a torque converter 3 of a per se well known and conventional sort, which receives supply of rotational energy from the internal combustion engine 1; and said automatic transmission 2 also comprises a gear transmission mechanism 4, which receives supply of said rotational energy from said torque converter 3 and which transmits said rotational energy, after (perhaps) altering the rotational speed thereof, to the rear wheels of the vehicle (not shown), via a differential device or the like, also not shown.

The internal combustion engine 1 is provided with and inhales air through an intake passage 5 (which may be either an air-fuel mixture intake passage or only an air intake passage, according as to whether the internal combustion engine 1 is provided with a carburetor or with a fuel injection system: the present invention is equally applicable in both cases), and within this intake passage 5 there is provided a throttle valve 6, which controls the flow resistance of this intake passage 5 in a per se well known manner. The opening and closing of the throttle valve 6 are controlled by the movement of a linkage, not particularly shown, which links the movement of said throttle valve 6 to the movement of a foot pedal or the like which may be adapted to be depressed by the foot of the driver of the vehicle to which the internal combustion engine is fitted; these arrangements are not shown because they are per se well known and conventional.

The fluid torque converter 3 comprises a pump impeller which is coupled via a power input shaft to the crankshaft of the internal combustion engine 1, a turbine runner which is coupled via a power output shaft to a power input shaft (to be described later) of the gear transmission mechanism 4, and a stator member. None of these members are particularly shown in the figure because they are all per se well known and conventional. Said fluid torque converter 3 also comprises a lock up clutch designated by the reference numeral 7 (and also per se well known) and schematically shown, which selectively directly couples together the aforesaid pump impeller and the aforesaid turbine runner, according to selective supply to said lock up clutch 7 of actuating hydraulic fluid pressure via a hydraulic fluid conduit 20 from a first electrically actuated hydraulic fluid pressure switching valve 8 which will be described hereinafter. Thus, when the pressure is supplied to said lock up clutch 7 through said conduit 20 from said first pressure switching valve 8, then said lock up clutch 7 mechanically couples together said pump impeller and said turbine runner, thus directly coupling together said power input shaft and said power output shaft of said fluid torque converter 3; but, on the other hand, when actuating pressure is not supplied to said lock up clutch 7 through said conduit 20 from said first pressure switching valve 8, then said lock up clutch 7 does not couple together said pump impeller and said turbine runner, and said fluid torque converter 3 is free to provide its torque conversion function, for converting torque between said pump impeller and said turbine runner.

The gear transmission mechanism 4 is also of a per se well known sort in the art, and provides a plurality of various different speed ratios between its power input shaft and its power output shaft (neither of which is particularly shown in the figure), according to selective supply of actuating hydraulic fluid pressures to various hydraulic fluid pressure actuated friction engaging mechanisms such as hydraulically operated clutches and hydraulically operated brakes which are comprised within said gear transmission mechanism 4. A full explanation of the various hydraulic fluid pressure actuated friction engaging mechanisms and of the gears and mechanism within the gear transmission mechanism 4 will not be given here; nor will their operation, or the actuation combinations of said hydraulic fluid pressure actuated friction engaging mechanisms which are required in order to provide the various speed ratios of the gear transmission mechanism 4, be explained, because these are per se well known and their full explanations are not required for an understanding of the principles of the present invention; in fact, only a first hydraulic fluid pressure actuated friction engaging mechanism and a second hydraulic fluid pressure actuated friction engaging mechanism, respectively designated by the reference numerals 9 and 10, will be discussed, and only these two hydraulic fluid pressure actuated friction engaging mechanisms are shown (schematically) in the figure. Each of these two hydraulic fluid pressure actuated friction engaging mechanisms 9 and 10 of course selectively couples together its own particular pair of coupled elements, but none of these coupled elements are shown in the figure because they are per se well known and conventional. Thus, according to selective combinations of supply and non supply of actuating hydraulic fluid pressure to the hydraulic fluid pressure actuated friction engaging mechanisms of the gear transmission mechanism 4, including the first hydraulic fluid pressure actuated friction engaging mechanism 9 and the second hydraulic fluid pressure actuated friction engaging mechanism 10, a particular one of various ones of the speed stages of the gear transmission mechanism 4 may be obtained. This function may in fact be implemented by constructing the gear transmission mechanism 4 as comprising various sets of planetary gear mechanism, or the like. The first hydraulic fluid pressure actuated friction engaging mechanism 9 is selectively provided with actuating hydraulic fluid pressure through a hydraulic fluid conduit 21 from a second electrically actuated hydraulic fluid pressure switching valve 11; and the second hydraulic fluid pressure actuated friction engaging mechanism 10 is selectively provided with actuating hydraulic fluid pressure through a hydraulic fluid conduit 22 from a third electrically actuated hydraulic fluid pressure switching valve 12.

A hydraulic fluid pump 14, which is continually operated while the internal combustion engine 1 is operating, sucks up hydraulic fluid from a hydraulic fluid reservoir 13, pressurizes this hydraulic fluid, and supplies it via a hydraulic fluid conduit 15 to a primary line hydraulic fluid pressure regulation valve 16. This primary regulation valve 16 regulates the pressure of this hydraulic fluid to a substantially constant value, by venting some of said hydraulic fluid through a vent hydraulic fluid conduit 28 back to the reservoir 13, and supplies the thus constant pressure regulated hydraulic fluid via a hydraulic fluid conduit 17 to a secondary line hydraulic fluid pressure regulation valve 18. This secondary regulation valve 18 regulates the pressure of this hydraulic fluid to an appropriate pressure value, which should be determined according to the current value of throttle opening of the engine throttle valve 6 as will be explained later, by venting some of said hydraulic fluid via a second vent hydraulic fluid conduit 29 back to the reservoir 13, and supplies the thus appropriately pressure regulated hydraulic fluid via a hydraulic fluid conduit 19 as a line pressure supply to said first electrically actuated hydraulic fluid pressure switching valve 8, to said second electrically actuated hydraulic fluid pressure switching valve 11, and to said third electrically actuated hydraulic fluid pressure switching valve 12.

Now more detail regarding the operation of the first, the second, and the third electrically actuated hydraulic fluid pressure switching valves 8, 11, and 13 will be given. When the first electrically actuated hydraulic fluid pressure switching valve 8 is supplied with actuating electrical energy from an electrical control device 30 which will be explained later with regard to its function, then said first electrically actuated hydraulic fluid pressure switching valve 8 connects the hydraulic fluid conduit 19 to the hydraulic fluid conduit 20, and hence hydraulic fluid pressure of the aforementioned appropriately regulated line pressure level is supplied to the lock up clutch 7 of the torque converter 3 via said hydraulic fluid conduit 20, thus engaging said lock up clutch 7 and causing said torque converter 3 to provide its function of direct transmission of input torque from its power input shaft to its power output shaft (neither of which is shown); but, on the other hand, when no actuating electrical energy is supplied to said first electrically actuated hydraulic fluid pressure switching valve 8 from said electrical control device 30, then said first electrically actuated hydraulic fluid pressure switching valve 8 instead connects a drain hydraulic fluid conduit 23 to the hydraulic fluid conduit 20, and hence no substantial hydraulic fluid pressure is supplied to the lock up clutch 7 of the torque converter 3 via said hydraulic fluid conduit 20, but on the contrary said lock up clutch 7 is drained, thus disengaging said lock up clutch 7 and causing said torque converter 3 to provide its function of torque conversion between its power input shaft to its power output shaft. Similarly, when the second electrically actuated hydraulic fluid pressure switching valve 11 is supplied with actuating electrical energy from the electrical control device 30, then said second electrically actuated hydraulic fluid pressure switching valve 11 connects the hydraulic fluid conduit 19 to the hydraulic fluid conduit 21, and hence hydraulic fluid pressure of the aforementioned appropriately regulated line pressure level is supplied to the first hydraulic fluid pressure actuated friction engaging mechanism 9 of the gear transmission mechanism 4 via said hydraulic fluid conduit 21, thus engaging said first hydraulic fluid pressure actuated friction engaging mechanism 9 and causing said first hydraulic fluid pressure actuated friction engaging mechanism 9 to provide its function of direct transmission of torque between its two coupled elements (neither of which is shown); but, on the other hand, when no actuating electrical energy is supplied to said second electrically actuated hydraulic fluid pressure switching valve 11 from said electrical control device 30, then said second electrically actuated hydraulic fluid pressure switching valve 11 instead connects another drain hydraulic fluid conduit 24 to the hydraulic fluid conduit 21, and hence no substantial hydraulic fluid pressure is supplied to the first hydraulic fluid pressure actuated friction engaging mechanism 9 of the gear transmission mechanism 4 via said hydraulic fluid conduit 21, but on the contrary said first hydraulic fluid pressure actuated friction engaging mechanism 9 is drained, thus disengaging said first hydraulic fluid pressure actuated friction engaging mechanism 9 and causing it to allow its coupled members to rotate with respect to one another, so that torque is not substantially transmitted between them. Again, similarly, when the third electrically actuated hydraulic fluid pressure switching valve 12 is supplied with actuating electrical energy from the electrical control device 30, then said third electrically actuated hydraulic fluid pressure switching valve 12 connects the hydraulic fluid conduit 19 to the hydraulic fluid conduit 22, and hence hydraulic fluid pressure of the aforementioned appropriately regulated line pressure level is supplied to the second hydraulic fluid pressure actuated friction engaging mechanism 10 of the gear transmission mechanism 4 via said hydraulic fluid conduit 22, thus engaging said second hydraulic fluid pressure actuated friction engaging mechanism 10 and causing said second hydraulic fluid pressure actuated friction engaging mechanism 10 to provide its function of direct transmission of torque between its two coupled elements (neither of which is shown); but, on the other hand, when no actuating electrical energy is supplied to said third electrically actuated hydraulic fluid pressure switching valve 12 from said electrical control device 30, then said third electrically actuated hydraulic fluid pressure switching valve 12 instead connects yet another drain hydraulic fluid conduit 25 to the hydraulic fluid conduit 22, and hence no substantial hydraulic fluid pressure is supplied to the second hydraulic fluid pressure actuated friction engaging mechanism 10 of the gear transmission mechanism 4 via said hydraulic fluid conduit 22, but on the contrary said second hydraulic fluid pressure actuated friction engaging mechanism 10 is drained, thus disengaging said second hydraulic fluid pressure actuated friction engaging mechanism 10 and causing it to allow its coupled members to rotate with respect to one another, so that torque is not substantially transmitted between them.

It should be understood that, although in the above described transmission which incorporates the shown preferred embodiment of the transmission control system according to the present invention the engagement and the disengagement of each of the relevant hydraulic fluid pressure actuated friction engaging mechanism is controlled by one particular electrically actuated hydraulic fluid pressure switching valve—i.e. the engagement and the disengagement of the first hydraulic fluid pressure actuated friction engaging mechanism 9 and the second hydraulic fluid pressure actuated friction engaging mechanism 10 are respectively controlled by the second electrically actuated hydraulic fluid pressure switching valve 11 and the third electrically actuated hydraulic fluid pressure switching valve 12—in fact this is not an essential feature of the present invention, and an alternative arrangement could be considered, in which each electrically actuated hydraulic fluid pressure switching valve has two switched ports, supply of the line hydraulic fluid pressure being provided to the one or the other of these switched ports by said electrically actuated hydraulic fluid pressure switching valve according to its electrically actuated or electrically non actuated condition. In such a case, the engagement switchover control of two hydraulic fluid pressure actuated friction engaging mechanisms may be controlled by the use of just one electrically actuated hydraulic fluid pressure switching valve, and accordingly with two electrically actuated hydraulic fluid pressure switching valves a total of four hydraulic fluid pressure actuated friction engaging mechanisms such as hydraulic clutches and hydraulic brakes may be controlled, i.e. may be supplied with actuating hydraulic fluid pressure or not, as appropriate.

Figure 2:
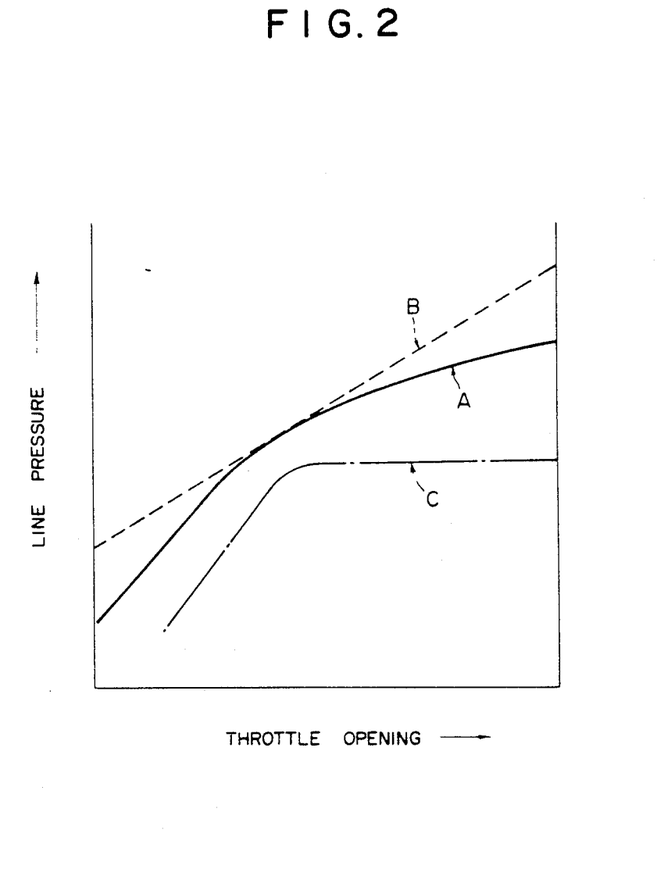
FIG. 2 is a chart, in which opening amount of a throttle valve of said internal combustion engine is shown on the horizontal scale and hydraulic fluid pressure and also torque acting on a hydraulic fluid pressure actuated friction engaging mechanism are shown on the vertical scale.

Referring now to FIG. 2, there is shown by the line "A" in this figure a graph of the line hydraulic fluid pressure output by the secondary line hydraulic fluid pressure regulation valve 18, with respect to throttle opening of the vehicle throttle valve 6; and in fact as will be seen from this line "A" the line hydraulic fluid pressure output by the secondary line hydraulic fluid pressure regulation valve 18 increases monotonically with increase of throttle opening, and at first in the low to medium throttle opening range said line hydraulic fluid pressure increases quite quickly with throttle opening, and substantially linearly with respect thereto with a first proportionality ratio; while when the value of throttle opening reaches the middle range then the rate of increase of said line hydraulic fluid pressure with throttle opening drops off quite quickly until said rate of increase reaches a certain lower value; and then thereafter with further increase of throttle opening said rate of increase of line hydraulic fluid pressure with throttle opening stabilizes and remains substantially constant thenceforwards, said line hydraulic fluid pressure thus thereafter increasing with respect to throttle opening substantially linearly with a second proportionality ratio which is substantially lower than said first proportionality ratio. This is provided by a mechanical construction as follows. To the throttle valve 6 (or rather actually to a throttle shaft not shown in the figure on which said throttle valve 6 is mounted) there is rotationally coupled a throttle arm 27, and the free end of this throttle arm 27 pulls and pushes on a throttle cable 26 which is only schematically shown, the other end of said cable being communicated to said secondary line hydraulic fluid pressure regulation valve 18. Although the construction of this secondary line hydraulic fluid pressure regulation valve 18 is not particularly shown in detail since various possibilities therefor will be apparent to a man of ordinary skill in the relevant art based upon the disclosure herein, in fact said throttle cable 26 drives a cam incorporated in said secondary line hydraulic fluid pressure regulation valve 18, similar to the cam in a per se well known and conventional type of throttle hydraulic fluid pressure regulation valve in a per se conventional type of transmission control device, so as to rotate said cam according to the rotation of the throttle valve 6; and a hydraulic fluid pressure regulatory mechanism in the secondary line hydraulic fluid pressure regulation valve 18 is constituted so as to regulate the line hydraulic fluid pressure which is to be outputted from said secondary line hydraulic fluid pressure regulation valve, according to the amount of lift provided by the cam face of said cam. Accordingly, as will be well understood by one of ordinary skill in the relevant art based upon the disclosure herein, by properly configuring the shape of the cam, any desired performance of variation of increase of line hydraulic fluid pressure with respect to increase of throttle opening may be obtained, as per any particular design requirements for the secondary line hydraulic fluid pressure regulation valve 18; i.e., any desired shape for the graph exemplarily shown in FIG. 2 by the line "A" may be obtained.

To the movement of the throttle valve 6 mounted in the intake passage 5 of the internal combustion engine 1 there is coupled the movement of a movable member (not particularly shown) of a throttle opening amount sensor 31, said throttle opening amount sensor 31 itself being of a per se well known sort which produces an electrical output signal indicative of the amount of movement of its said movable member, i.e. of the amount of opening of said throttle valve 6. Specifically, the throttle opening amount sensor 31 may be constructed so as to produce an electrical signal directly proportional to the amount of opening of the throttle valve 6, i.e. with the same behavior with respect to opening of the throttle valve 6 as the behavior of a conventional hydraulic type throttle opening amount sensor which produces a hydraulic fluid pressure output signal.

Similarly, to the rotation of the power output shaft of the gear transmission mechanism 4 (said power output shaft not being shown in the figure) there is coupled a rotating member (not particularly shown in the figure either) of a vehicle road speed sensor 32, said vehicle road speed sensor 32 itself being of a per se well known sort and producing an electrical output signal which is indicative of the speed of rotation of said rotating member, i.e. of the speed of rotation of said power output shaft of said gear transmission mechanism 4, which is of course indicative of the road speed of the vehicle incorporating this transmission system. Specifically, the vehicle road speed sensor 32 may be constructed to output an electrical signal which is directly proportional to vehicle road speed, i.e. with the same behavior of variation with regard to vehicle road speed as the variational behavior of a conventional hydraulic type vehicle road speed sensor which produces a hydraulic fluid pressure output signal.

Selective supply of actuating electrical energy to the first electrically actuated hydraulic fluid pressure switching valve 8 which controls selective supply of hydraulic fluid pressure to the lock up clutch 7 of the torque converter 3, selective supply of actuating electrical energy to the second electrically actuated hydraulic fluid pressure switching valve 11 which controls selective supply of hydraulic fluid pressure to the first hydraulic fluid pressure actuated friction engaging mechanism 9 of the gear transmission mechanism 4, and selective supply of actuating electrical energy to the third electrically actuated hydraulic fluid pressure switching valve 12 which controls selective supply of hydraulic fluid pressure to the second hydraulic fluid pressure actuated friction engaging mechanism 10 of the gear transmission mechanism 4, is provided from an electrical transmission control device 30, which may in fact incorporate a microcomputer, and which is itself of a per se well known sort. Accordingly, this transmission control system as a whole is of an electrical/hydraulic type.

In general terms (since a detailed understanding of the structure or operation of the electrical transmission control device 30 is not required for an understanding of the principles of the present invention) the electrical transmission control device 30 receives input of the electrical signal from the throttle opening amount sensor 31, which is indicative of the amount of opening of the throttle valve 6 which controls the intake passage 5, and also receives supply of the electrical signal from the vehicle road speed sensor 32, which is indicative of the road speed of the vehicle incorporating the internal combustion engine 1 and the transmission 2. The electrical transmission control device 30 compares these electrical signals with one another, and based upon the result of this comparison and upon other data (such as for example the range of transmission speed stages which is currently selected by the driver of the vehicle on a manual range selection valve, not particularly shown in the figure) makes a control decision as to which speed stage the gear transmission mechanism 4 should currently be set to, and as to whether the lock up clutch 7 should be currently engaged or disengaged. Based upon the results of these decisions, the electrical transmission control device 30 outputs control signals to various electrically actuated hydraulic fluid pressure switching valves, including the first electrically actuated hydraulic fluid pressure switching valve 8 which controls selective supply of hydraulic fluid pressure to the lock up clutch 7, the second electrically actuated hydraulic fluid pressure switching valve 11 which controls selective supply of hydraulic fluid pressure to the first hydraulic fluid pressure actuated friction engaging mechanism 9, and the third electrically actuated hydraulic fluid pressure switching valve 12 which controls selective supply of hydraulic fluid pressure to the second hydraulic fluid pressure actuated friction engaging mechanism 10, and possibly to other electrically actuated hydraulic fluid pressure switching valves which are not shown in the figure, so as (generally speaking) properly to set the gear transmission mechanism 4 and the lock up clutch 7 to the proper speed stage and the proper engaged or disengaged condition; in particular, in order properly to attain this end, so as properly to engage or disengage the aforesaid lock up clutch 7, the aforesaid first hydraulic fluid pressure actuated friction engaging mechanism 9, and the aforesaid second hydraulic fluid pressure actuated friction engaging mechanism 10.

Now, referring to FIG. 2, the operation of the transmission control system according to the present invention will be explained. FIG. 2 is a chart in which throttle opening amount is shown along the horizontal axis and line hydraulic fluid pressure and also torque acting on a hydraulic fluid pressure actuated friction engaging mechanism (such as for example the first hydraulic fluid pressure actuated friction engaging mechanism 9 or the second hydraulic fluid pressure actuated friction engaging mechanism 10) are both shown along the vertical axis. In detail, in this figure, the solid line designated as "A" shows the behavior of the line hydraulic fluid pressure (i.e. of the output hydraulic fluid pressure produced by the secondary line hydraulic fluid pressure regulation valve 18 and supplied to the first, second, and third electrically actuated hydraulic fluid pressure switching valves 8, 11, and 12) in the above described preferred embodiment of the transmission control system according to the present invention, as throttle opening amount varies; the dashed line designated as "B" similarly shows the behavior of the line hydraulic fluid pressure in the case of a typical prior art hydraulic type transmission control system of the sort described in the portion of this specification entitled "BACKGROUND OF THE INVENTION", as throttle opening amount varies; and the single dotted line designated as "C" shows the behavior of the torque required to be transmitted by a typical hydraulic fluid pressure actuated friction engaging mechanism (said torque being converted to the equivalent line hydraulic fluid pressure which is most suitable for engaging said hydraulic fluid pressure actuated friction engaging mechanism from the disengaged condition so as to transmit said torque, for purposes of comparison with the other lines in the figure) when said hydraulic fluid pressure actuated friction engaging mechanism is engaged, as throttle opening amount varies.

It will be understood from these three lines "A", "B", and "C" that the performance of variation with respect to throttle opening amount of the line hydraulic fluid pressure output by the secondary line hydraulic fluid pressure regulation valve 18 and supplied to the first, second, and third electrically actuated hydraulic fluid pressure switching valves 8, 11, and 12, in the above described preferred embodiment of the transmission control system according to the present invention, (as shown by the line designated as "A") is well suited to the performance of variation with respect to throttle opening amount of the equivalent line hydraulic fluid pressure which is most suitable for engaging a typical hydraulic fluid pressure actuated friction engaging mechanism from the disengaged condition so as to transmit the torque which said hydraulic fluid pressure actuated friction engaging mechanism is required to transmit when it is in the engaged condition (as shown by the line designated as "C"). In other words, like the torque which said typical hydraulic fluid pressure actuated friction engaging mechanism is required to transmit when engaged, said line hydraulic fluid pressure, as provided in the shown preferred embodiment of the transmission control system according to the present invention, in the low to medium engine load (i.e. the low to medium throttle opening amount) operational region increases quite quickly in proportion to increase in engine load, i.e. with a fairly large proportionality ratio; but, in the medium to high engine load (i.e. the medium to high throttle opening amount) operational region, said line hydraulic fluid pressure provided in the operation of the shown preferred embodiment of the transmission control system according to the present invention rises rather slowly (i.e. with a rather small proportionality ratio), in proportion to increase in engine load. This should be contrasted with the behavior of variation with respect to engine load of the line hydraulic fluid pressure in the aforementioned typical prior art hydraulic type transmission control system, as shown by the line designated as "B", which is a behavior of substantially strict proportionality to engine load (i.e. engine throttle opening amount, with substantially the same proportionality ratio over substantially the entire range of engine load from the very low engine load region to the very high engine load region.

As an alternative, it could be so arranged that the right hand portion of the line designated as "A" in FIG. 2 was flat or virtually flat; in other words, that the line hydraulic fluid pressure in the low to medium engine load (i.e. the low to medium throttle opening amount) operational region increased quite quickly in proportion to increase in engine load, i.e. with a fairly large proportionality ratio; but, in the medium to high engine load (i.e. the medium to high throttle opening amount) operational region, said line hydraulic fluid pressure provided in the operation of such an embodiment of the transmission control system according to the present invention rose not at all or virtually not at all along with increase in engine load. This kind of variation behavior of the line hydraulic fluid pressure might be particularly suitable in a particular case, depending upon circumstances.

Accordingly, therefore, it will be understood that in the operation of the transmission control system according to the present invention, by contrast to the operation of a prior art hydraulic type transmission control system, the actuating hydraulic fluid pressure for the various hydraulic fluid pressure actuated friction engaging mechanisms is much more suitably adjusted according to varying engine load; and therefore much smoother transmission operation is available when shifting between speed stages of said transmission, avoiding jerking, transmission shift shock, slippage, and engine over revving; which contributes greatly to the durability of a transmission which is controlled by a transmission control system according to the present invention. Further, because the line hydraulic fluid pressure, in the operation of the shown preferred embodiment of the transmission control system according to the present invention, is generally lower than in the prior art, and particularly is substantially lower both in the low engine load operational region and in the high engine load operational region than in the case of a conventional hydraulic type transmission control system, therefore the amount of energy, produced by the internal combustion engine 1, which is required for pumping hydraulic fluid within the transmission and within the transmission control system is substantially decreased as compared with such a prior art, thereby making for improved fuel economy of the vehicle as a whole during operation.

This has been possible because, according to the present invention, no reliance is made on the line hydraulic fluid pressure for providing a source of hydraulic fluid pressure for modulation to provide the throttle hydraulic fluid pressure; and, similarly, no reliance is made on the line hydraulic fluid pressure for providing a source of hydraulic fluid pressure for modulation to provide the governor hydraulic fluid pressure. In fact, according to the present invention the moment by moment values of engine throttle opening amount and of vehicle road speed are signaled to the means which makes decisions as to what speed stage the automatic transmission gear transmission mechanism 4 should be shifted (i.e. is signaled to the electrical transmission control device 30), purely by electrical signals (i.e. by the electrical output signals of the throttle opening amount sensor 31 and of the vehicle road speed sensor 32), and not by hydraulic fluid pressure signals at all. Accordingly, in fact, the behavior of variation with respect to engine load of the line hydraulic fluid pressure can be tailored substantially entirely from the point of view of providing the most desirable characteristics for supply of said line hydraulic fluid pressure as a source of actuating hydraulic fluid pressure for the hydraulic fluid pressure actuated friction engaging mechanisms of the gear transmission mechanism, without any consideration being required to be given as to how such tailoring may adversely affect the characteristics of the line hydraulic fluid pressure as a source of hydraulic fluid pressure for modulation to provide the throttle hydraulic fluid pressure and/or the governor hydraulic fluid pressure. This tailoring is accomplished, in the shown preferred embodiment of the transmission control system according to the present invention, by the cam mechanism incorporated in the secondary line hydraulic fluid pressure regulation valve 18, and, as the profile of the cam can be set according to any particular pattern desired by the designer of the automatic transmission control system, it will be easily understood that the characteristics of variation of the line hydraulic fluid pressure with respect to variation of engine load may thus be arbitrarily tailored, so as to provide a line hydraulic fluid pressure which is most suitable for actuating the various hydraulic fluid pressure actuated friction engaging mechanisms of the automatic transmission gear transmission mechanism, in any individual case.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. For an automatic transmission, for a vehicle comprising an engine, comprising a gear transmission mechanism which comprises a power input shaft powered by said engine, a power output shaft which powers said vehicle so as to drive said vehicle along the road, and at least one hydraulic fluid pressure actuated friction engaging mechanism; and which according to selective supply of hydraulic fluid pressure to said hydraulic fluid pressure actuated friction engaging mechanism provides particular ones of a plurality of speed stages between said power input shaft and said power output shaft:

a transmission control system, comprising:
(a) a first engine load sensor which senses the current value of a first parameter representative of the load on said engine and outputs a mechanical movement representative of said current value of said first parameter;
(b) a second engine load sensor which senses the current value of a second parameter representative of the load on said engine and outputs an electrical signal representative of said current value of said second parameter;
(c) a vehicle road speed sensor which senses the current value of a parameter representative of the current road speed of said vehicle and which outputs a vehicle road signal representative of said current value of said parameter representing vehicle road speed;
(d) a line hydraulic fluid pressure generator which is mechanically controlled by said mechanical movement output from said first engine load sensor and generates a line hydraulic fluid pressure varying in response to the current value of said mechanical movement output;
(e) an electrically actuated hydraulic fluid pressure switching valve, which according to selective supply of actuating electrical energy thereto selectively supplies said line hydraulic fluid pressure to said hydraulic fluid pressure actuated friction engaging mechanism as an actuating hydraulic fluid pressure; and
(f) an electrical control device, which receives the current value of said electrical signal from said second engine load sensor and the current value of said vehicle road speed signal from said vehicle road speed sensor, and which according to the current values of said engine load electrical signal and said vehicle road speed signal selectively supplied actuating energy to said electrically actuated hydraulic fluid pressure switching valve.

2. A transmission control system according to claim 1, wherein said line hydraulic fluid pressure generator increases the line hydraulic fluid pressure which it generates approximately proportionally to engine load with a certain first proportionality ratio as engine load increases from the low engine load region to the medium engine load region, and wherein said line hydraulic fluid pressure generator increases the line hydraulic fluid pressure which it generates approximately proportionately to engine load with a certain second proportionality ratio as engine load increases from the medium engine load region to the high engine load region, said second proportionality constant being substantially less than said first proportionality constant.

3. A transmission control system according to claim 1, wherein said line hydraulic fluid pressure generator increases the line hydraulic fluid pressure which it generates approximately proportionately to engine load with a certain proportionality ratio as engine load increases from the low engine load region to the medium engine load region, and wherein said line hydraulic fluid pressure generator keeps the line hydraulic fluid pressure which it generates approximately constant as engine load increases from the medium engine load region to the high engine load region.

4. A transmission control system according to any one of claims 2, 3 or 1, wherein said line hydraulic fluid pressure generator generates a line hydraulic fluid pressure which is approximately proportional to the torque required to be transmitted by said hydraulic fluid pressure actuated friction engaging mechanism when said hydraulic fluid pressure actuated friction engaging mechanism is engaged by being supplied with actuating hydraulic fluid pressure, over substantially the entire engine load range.

5. A transmission control system according to any one of claims 2, 3 or 1, wherein said line hydraulic fluid pressure generator generates a line hydraulic fluid pressure which is approximately the most appropriate hydraulic fluid pressure for engaging said hydraulic fluid pressure actuated friction engaging mechanism without substantial slippage thereof, when said hydraulic fluid pressure actuated friction engaging mechanism is engaged by being supplied with actuating hydraulic fluid pressure, over substantially the entire engine load range.

6. A transmission control system according to any one of claims 2, 3 or 1, wherein said line hydraulic fluid pressure generator generates a line hydraulic fluid pressure which is approximately the most appropriate hydraulic fluid pressure for engaging said hydraulic fluid pressure actuated friction engaging mechanism without substantial jerk being caused by the engagement thereof, when said hydraulic fluid pressure actuated friction engaging mechanism is engaged by being supplied with actuating hydraulic fluid pressure, over substantially the entire engine load range.

7. A transmission control system according to any one of claims 2, 3 or 1, wherein said line hydraulic fluid pressure generator comprises a primary line hydraulic fluid pressure regulation valve which generates a substantially constant hydraulic fluid pressure and a secondary line hydraulic fluid pressure regulation valve which modulates said substantially constant hydraulic fluid pressure to produce said line hydraulic fluid pressure.

* * * * *